United States Patent [19]

Deerwester

[11] Patent Number: 5,778,362
[45] Date of Patent: Jul. 7, 1998

[54] METHOD AND SYSTEM FOR REVEALING INFORMATION STRUCTURES IN COLLECTIONS OF DATA ITEMS

[75] Inventor: Scott Deerwester, Clearwater Bay, Hong Kong

[73] Assignee: KDL Technologies Limted, Hong Kong, Switzerland

[21] Appl. No.: 667,520

[22] Filed: Jun. 21, 1996

[51] Int. Cl.[6] .................................................. G06F 17/30
[52] U.S. Cl. .............................. 707/5; 3/6; 704/7; 704/9; 395/20
[58] Field of Search ........................... 707/3, 5, 6; 704/7, 704/9; 395/20

[56] References Cited

U.S. PATENT DOCUMENTS

| | | | |
|---|---|---|---|
| 4,839,853 | 6/1989 | Deerwester et al. | 364/900 |
| 5,014,219 | 5/1991 | White | 364/513 |
| 5,278,980 | 1/1994 | Pederson et al. | 707/4 |
| 5,301,109 | 4/1994 | Landauer et al. | 364/419.19 |
| 5,303,330 | 4/1994 | Gersho et al. | 395/24 |
| 5,317,507 | 5/1994 | Gallant | 364/419.13 |
| 5,325,298 | 6/1994 | Gallant | 364/419.19 |
| 5,418,948 | 5/1995 | Turtle | 707/4 |
| 5,471,596 | 11/1995 | Brown, III | 707/103 |
| 5,488,725 | 1/1996 | Turtle et al. | 707/5 |
| 5,542,090 | 7/1996 | Henderson et al. | 395/600 |
| 5,619,709 | 4/1997 | Caid et al. | 395/794 |
| 5,640,553 | 6/1997 | Schultz | 707/5 |
| 5,659,742 | 8/1997 | Beattie et al. | 707/104 |
| 5,675,710 | 10/1997 | Lewis | 395/10 |
| 5,675,819 | 10/1997 | Schuette | 395/760 |

FOREIGN PATENT DOCUMENTS 0 687 987  12/1995  European Pat. Off. .

OTHER PUBLICATIONS

Heinrich, Andreas, "Adapting a spatial access structure for document representations in vector space.", Proceedings of the 1996 5th ACM CIKM International Conference on Information and Knowledge Management, pp. 19–26, Nov. 1996.

Murai et al., "A modal logical interpretation of vector models for document retrieval", Tensor, New Series, v. 55 (1), pp. 101–106, Jan. 1994.

Shafique et al., "Intelligent agent–based on–line information retrieval.", Learned Information, pp. 259–265, Dec. 1995.

Mark, et al., "Document retrieval systems.", University of Illinois Urbana Coordinated Science Lab, p. 119, Jan. 1972.

Cohen, et al., "Approximating matrix multiplication for pattern recognition tasks.", Proceedings of the 1996 8th Annual ACM–SIAM Symposium on Discrete Algorithms., pp. 682–691, Jan. 1997.

Damashek, "Gauging Similarity with n–Grams: Language–Independent Categorization of Text," Science, vol. 267, No. 5199 (Feb. 10, 1995), pp. 843–848.

Aalbersberg, "A Document Retrieval Model Based on Term Frequency Ranks," SIGIR '94 Conf. 17 (Jul. 3, 1994), pp. 163–172.

International Search Report for PCT Intl. Appl. No. PCT/IB/00744, dated Sep. 23, 1997.

International Search Report for PCT Intl. Appl. No. PCT/IB/00743, dated Sep. 23, 1997.

Notice of References Cited (Form PTO–849) for U.S. Serial No. 08/667,544, issued with Office Action dated Sep. 22, 1997.

*Primary Examiner*—Thomas G. Black
*Assistant Examiner*—Jean R. Homere
*Attorney, Agent, or Firm*—Finnegan, Henderson, Farabow, Garrett & Dunner, L.L.P.

[57] ABSTRACT

In analyzing a collection of data items to determine data structures, the collection of data items is treated as a two-dimensional map. A query vector with elements of interest is composed with the map to form a result vector. A profile vector formed from the matrix is combined with the result vector to form a discrimination vector representing the degree of expectation that the elements of the query vector related to the map.

16 Claims, 6 Drawing Sheets

METHOD AND SYSTEM FOR REVEALING INFORMATION STRUCTURES IN COLLECTIONS OF DATA ITEMS

BACKGROUND OF THE INVENTION

The present invention relates to the field of data analysis. More particularly, the present invention relates to methods and systems for analyzing collections of data items to reveal structures, such as associative structures, within the collections of data items.

Modern digital systems provide easy access to large amounts of information. For example, users can access great quantities of information in databases on a network or even in personal computers. Mere access to large amounts of information has limited value, however, without knowing what is useful about the information.

From a generic perspective, all information consists of discrete items, and those items of information are typically associated with a set of "attributes" relating to characteristics of the items. Each attribute has an identifier and a value. For example, in a collection of documents (e.g., items of information), one possible set of attributes could be the various words that occur in the documents, and the values might be the frequencies with which the words occur in a particular document. Where attribute values of one item appear to correlate to attribute values of another item, this correlation may give rise to an "associative structure" between the items. Identifying these associative structures can provide a useful understanding of how the information items relate, and can assist in analyzing the information.

Identifying such associative structures is difficult, however, because inherent structures of data, such as associative structures, are seldom uniform within data sets, which make them difficult to identify. Further, although some explicit data structures may be readily apparent, the implicit, or hidden, data structures often provide greater value. Conventional information analysis rarely permits discovery or extraction of the implicit data structures, or knowledge, within data sets.

One conventional mechanism of retrieving document information from text databases is to enter search terms connected by Boolean operators. Using this technique, a user instructs a system to search a text database and retrieve documents containing the search terms in the specified Boolean relationship. Unfortunately, this technique often produces inadequate results, such as documents of no interest to the user, although containing the entered search terms. More significantly, this technique overlooks documents that would be of interest to the user if those documents lack the precise terms in the relationship specified.

Known artificial intelligence techniques are also inadequate to identify implicit structures in data sets. For example, neural networks solve problems through training, but training may not be available to determine implicit data structures if those data structures cannot be predicted or identified easily enough to devise the needed training. Also, the length of time needed to train a neural network to solve a problem often makes such networks impractical.

Moreover, statistical techniques, such as hierarchical clustering, partition clustering, and singular value decomposition, call for distance measures or similarity measures defining the relationship between pairs of items within a data set, but conventional data analysis techniques are inadequate to calculate such measures. Accordingly, there is a need for calculating distance and/or similarity measures to serve as input to statistical techniques.

SUMMARY OF INVENTION

This invention is directed to data analysis methods and systems that reveal information structures in collections of data items.

It is an object of the invention to identify structure, such as an associative structure, within a data set.

It is another object of the invention to cross-correlate data from at least two sets of data to identify structures appearing between these sets of data.

It is yet another object of the invention to identify similarities among attributes within at least one data set.

It is a further object of the invention to calculate distance and similarity measures defining relationships between pairs of items within a data set.

In one aspect, the invention, as embodied and broadly described, includes a method for retrieving information from a collection of items each having a corresponding item identifier and each being associated by a scalar value with an attribute having a corresponding attribute identifier, at least one of the attributes also being associated with another of the items in the collection. The method comprises the steps, carried out by a data processor, of presenting the collection as a map of tuples of item identifiers, attribute identifiers, and scalar values; forming a query vector composed of pairs of attribute identifiers and scalar values; and composing the query vector and the map to produce a result vector composed of pairs of item identifiers and corresponding scalar values. The scalar values represent the relationship of the query vector and the map for the items having the corresponding item values.

In another aspect, the invention includes a computer system for deriving structure from a set of information comprising an agent, coupled to the set of information to retrieve tuples of information from the sets; a kernel, coupled to the agent, for deriving structure from the tuples of information received from the agents; and a front end unit, coupled to the kernel, for receiving the user input. The kernel includes means for forming the tuples of information into a map of item identifiers, attribute identifiers, and scalar values; means for forming a query vector from a user input, the query vector having pairs of attribute identifiers and scalar values; and means for composing the query vector and the map to produce a result vector having pairs of item identifiers and corresponding scalar values.

It is to be understood that both the foregoing general description and the following detailed description are exemplary and explanatory, and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention, and, together with the description, serve to explain the principles of the invention.

In the drawings.

DETAILED DESCRIPTION

A. Introduction

The invention identifies data structures present within a collection of data items by treating the collection as a of data items as a two-dimensional data matrix or "map," and performing matrix and mathematical operations. A map is implemented as an associative table whose keys are items and which enables efficient retrieval of a list of attribute id/value pairs for each item. Such associative tables are distinguished from common B tree or hash file implementations in that the lists retrieved per item may be of arbitrary size, allowing any number of attribute id/value pairs may be retrieved.

Any such data structure or system presenting this functionality can serve as the implementation of a map. Conversely, knowledge discovery, according to this invention, can be performed on any such data structure or system given a programmatic means of passing such retrieval requests to the data structure or system, and subsequently interpreting the results.

In a preferred embodiment, a map is implemented as a blockwise, prefix-omitted binary-searchable file. Such files represent item/attribute/value triples as ASCII tab-separated fields in a text file, with one triple per line. Each line is encoded by first storing two eight bit unsigned integers, one of which represents the number of characters that the beginning of the current line has in common with the beginning of the preceding line. The second eight-bit unsigned integer represents the number of additional characters on the current line. These characters, with no end- of-line character, are stored as well.

The first line in each block is stored as though it shares no characters with the last line of the preceding block. Blocks are padded with eight-bit bytes containing all ones if there is not room for an entire line at the end of the block. This data structure is searched using a standard binary search algorithm to identify the block in which the attribute id/value pair list for a given item must begin if it is present. Once a block is identified, it is searched sequentially. With this data structure, searching becomes faster as the structure is used, with modest disk overhead and a minimum of disk accesses. The computer can perform a binary search for the appropriate date block and extract the data from RAM.

By way of example, if the data items were documents, the map could be arranged as a document-by-term matrix. One coordinate axis of the map would correspond to document names, and the other coordinate axis would correspond to terms. Each cell entry in the matrix could be the frequency that a corresponding term occurs in the corresponding document. The set of documents and the set of terms are "clans." A clan is an enumerable set of like items.

Data structures within the map may be revealed by "composing" the map with queries using matrix and mathematical operations described below in Section B.

By representing the data items in a matrix, the invention uses some inherent characteristics of matrices to determine data structures. For example, a two-dimensional matrix can be represented as a product of three matrices: a columnwise orthogonal matrix, a diagonal matrix, and a transposed columnwise orthogonal matrix. Decomposing the two-dimensional matrix into the constituent matrices is a technique known as "singular value decomposition." The technique of singular value decomposition is described in U.S. Pat. No. 4,839,853, the contents of which are hereby incorporated by reference.

Figure 1:
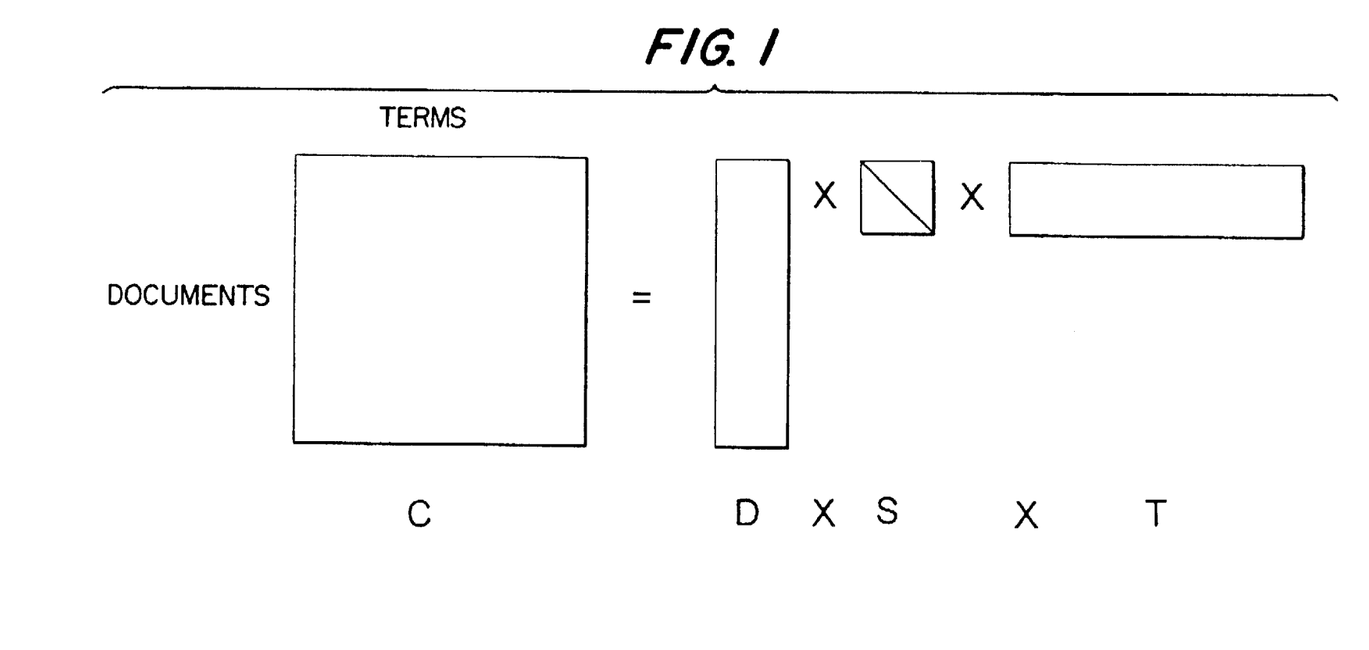
FIG. 1 is a representation of a two-dimensional matrix and its constituent matrices.

For instance, in FIG. 1, document-by-term matrix C is shown as equivalent to the product of a document matrix D, a matrix S, and a term matrix $T^T$. Matrix D is columnwise orthogonal and matrix T is columnwise orthogonal and transposed. Matrix S is a diagonal matrix whose elements are decreasing and nonnegative. One may use this relationship to solve for either matrix D, given the values for matrices C, S, and T, or matrix T, given the values for matrices C, S, and D.

The present invention also takes advantage of characteristics found in statistical models, such as the Poisson distribution. For example, the invention can be used to perform mathematical operations based upon the model that the mean is equal to the standard deviation. This is used to arrive at "discrimination vectors," described below, because this property closely approximates many data structures and behavioral patterns.

B. Operation

The invention provides several operations for analyzing collections of data items. These operations include data retrieval, discrimination analysis, cross-category analysis, structure analysis, and affinity analysis.

1. Data Retrieval

Figure 2:
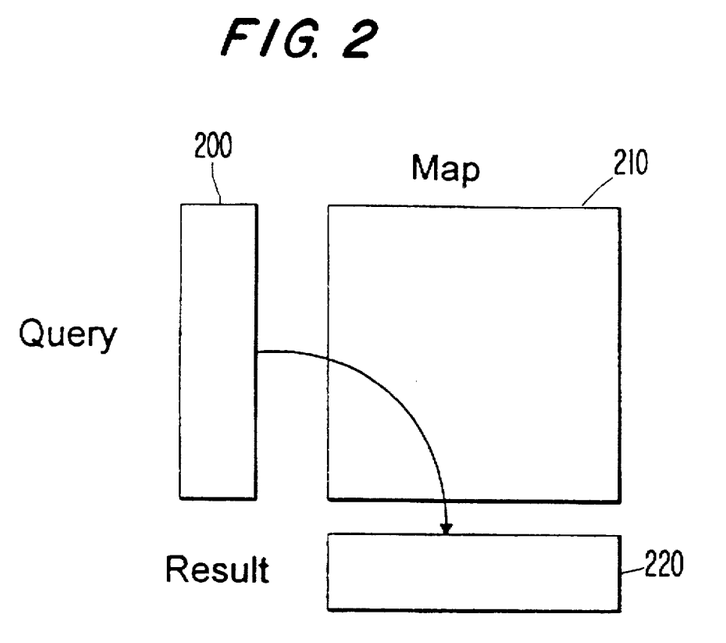
FIG. 2 is a representation of the compose function, in accordance with the invention.

To retrieve data from a map, a user forms a "query vector," which is preferably a one-dimensional matrix represented as a list of item identifiers or attribute identifiers and their corresponding values. If the map were a document-by-term matrix, the query vector may be represented as a list of related documents and scalar weights or a list of related terms and scalar weights. When a vector is so represented, the implicit value associated with any member of the vector's clan not in the list is implicitly zero. FIG. 2 is a conceptual illustration of the compose function. As shown in FIG. 2, the dot product of query vector 200 and map 210, illustrated as a curved arrow, produces a result vector 220.

The dot product can be calculated as follows:

$$\text{dot product} = SQR(d_1 * d_2),$$

where SQR is the square root function, $d_1$ is the weight of a member of the vectors' clan in vector $V_1$ and $d_2$ is the weight of the same member of the clan in vector $V_2$.

The query vector is combined with the map through a "compose" function. The "compose" function is a particular higher order function whose arguments are an item vector and a map, and whose result is an attribute vector. Conceptually, compose sequentially takes each item/value pair from the item vector, and the corresponding row vector from the map, combining them somehow and accumulating a result row vector. The combination between the vector and the map is thus a linear combination. In the actual implementation, standard numerical analysis techniques can be used to achieve better performance than the simple algorithm described here would achieve.

In the preferred embodiment, the compose function involves taking the dot product of the map and query vector to form another one- dimensional matrix called a "result vector." The result vector lists terms or documents, depending upon whether the query vector lists documents or terms, respectively.

By way of example, a user can create a query vector of a group of terms. The dot product of the query vector and map forms a result vector of a list of documents. The values contained in the result vector represent the frequency distribution of the documents according to the terms listed in the query vector.

In another example, a user can create a query vector of a group of documents. When the user composes the query vector and map, a result vector is formed of a list of terms. The result vector represents a frequency distribution of the terms within the documents listed in the query vector.

2. Discrimination Analysis

As explained above, the result vector can provide a frequency distribution of documents or terms, depending upon the clan of the elements in the query vector. Data structures can be revealed by performing mathematical operations, or "lambda" functions, on the result vector to produce a discrimination vector. The discrimination vector reflects the degree that certain terms appearing in documents listed in the query vector were as expected.

Figure 3:
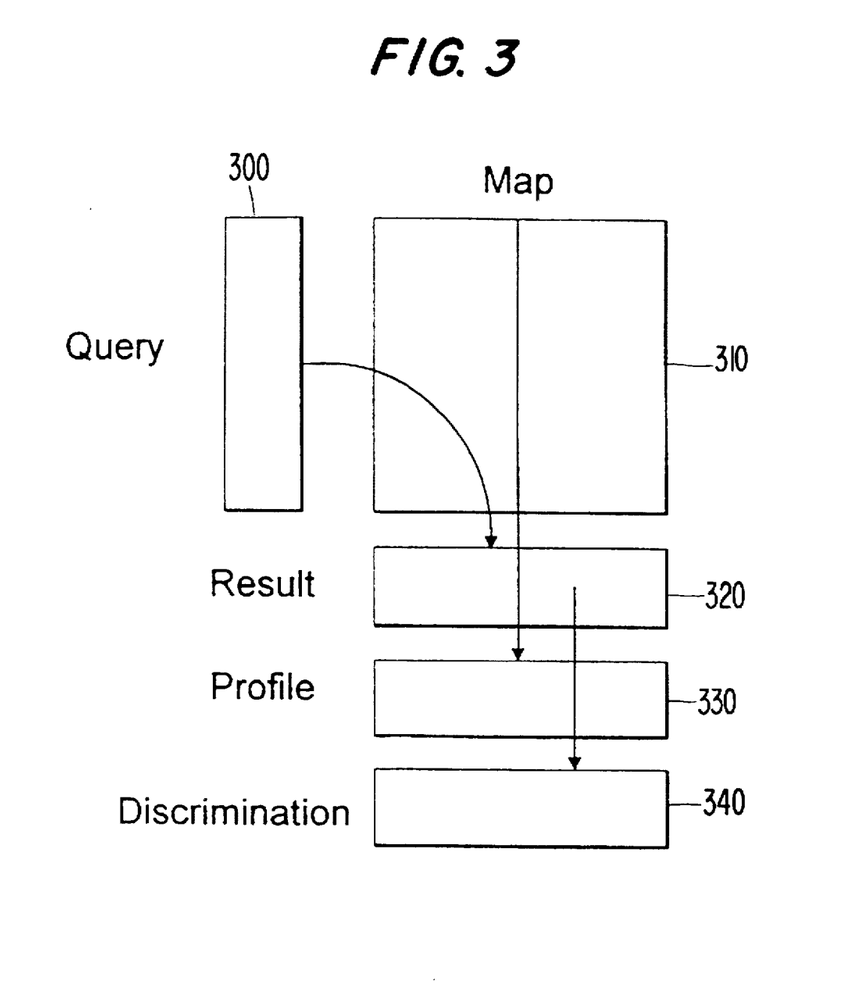
FIG. 3 is a representation of the lambda function, in accordance with the invention.

In a preferred embodiment, the lambda function is performed by forming a profile vector from the map and combining the profile vector with the result vector to form a discrimination vector. This function is illustrated in FIG. 3. The dot product of query vector 300 and map 310 forms result vector 320. Profile vector 330 is formed from map 310 and lambdaed with result vector 320 to form discrimination vector 340. A user can then analyze discrimination vector 340 to ascertain relationships in the data items contained in map 310.

Profile vector 330 is preferably a one-dimensional matrix having the same number of entries as result vector 320 and contains entries representing expected values, such as expected frequencies of terms within documents. If map 310 is a document-by-term matrix, profile vector 330 can be formed by summing the values of each column of map 310.

In such a case, discrimination vector 340 can be formed using the following equation, for $1 \leq x \leq n$:

$$d_x = SQR\ ((ABS(f_x/E(f_x)-1))*sign(f_x-E(f_x))),$$

where "d" is a corresponding entry in discrimination vector 340, "SQR" represents the square root function, "ABS" represents the absolute value function, "f" is an entry in result vector 320, "E(f)" is an entry in profile vector 330 corresponding to f in result vector 320, and "sign" represents the sign function.

The values of d reflect the significance of the corresponding attributes or items.

For example, when d equals 0 the corresponding term occurred as frequently as expected.

When d equals −1, the corresponding term did not occur at all. When d equals a large positive value the corresponding term occurred much more frequently than expected.

Thus, using discrimination vectors, users can ascertain relationships between elements of query vectors and elements of result vectors that may not have been apparent.

3. Cross-category Analysis

"Cross-category analysis" can be used to derive direct relationships between clans for which only indirect relationships are available. This operation can be performed by determining a second map query vector formed by composing an initial query vector with the first map and performing the lambda operation on that result. This forms a discrimination vector, which will also be the second map query vector, essentially bridging the first and second maps. As such, the second map query vector provides a virtual map reflecting the relationship between the items of the first and second maps.

Figure 4:
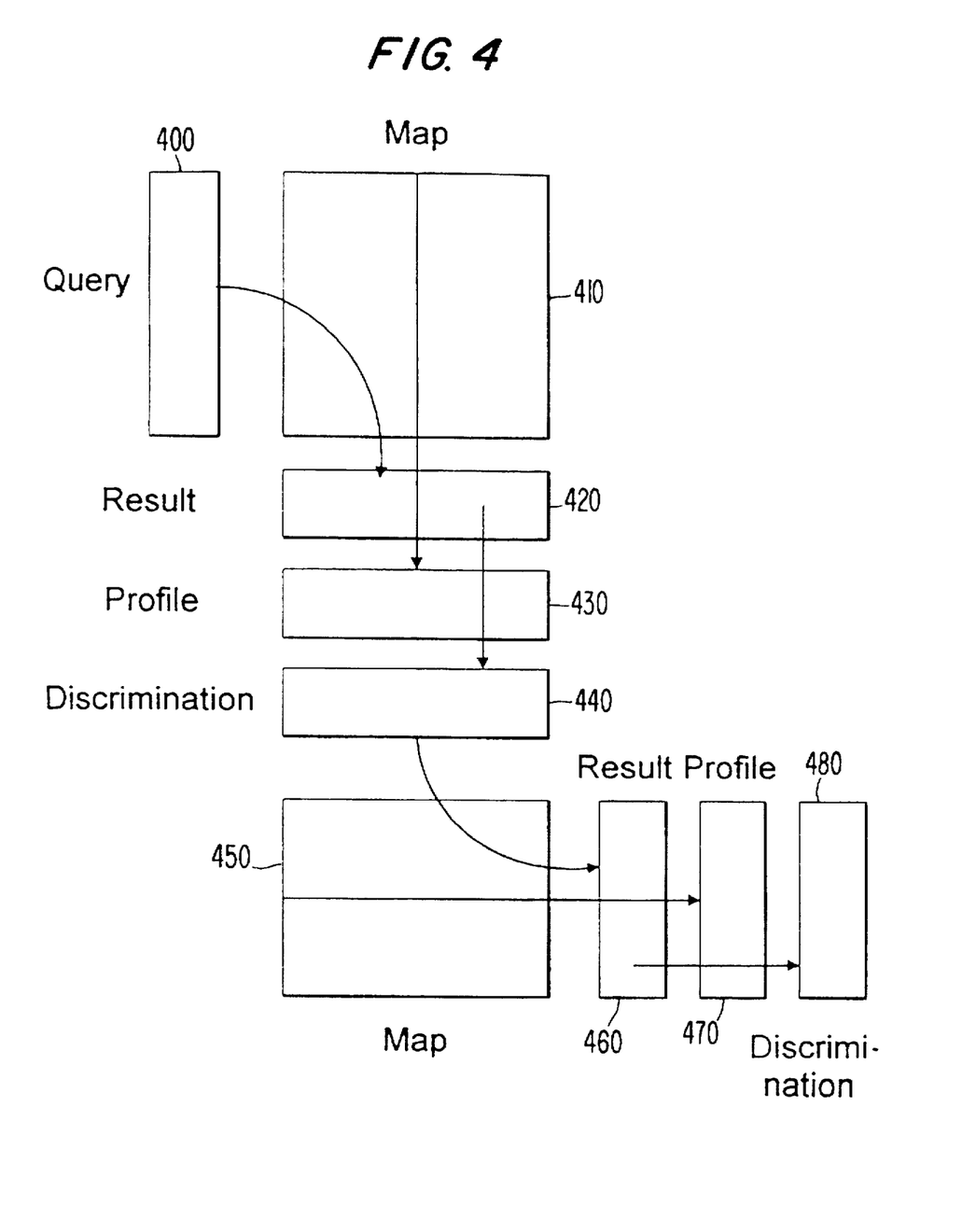
FIG. 4 is a representation of cross-correlation analysis, in accordance with the invention.

As shown in FIG. 4, result vector 420 is formed by the dot product of query vector 400 and map 410. A profile vector 430 is formed using the entries from map 410 and lambdaed with result vector 420 to form discrimination vector 440. Discrimination vector 440 then serves as a query vector to map 450. The dot product of discrimination vector 440 and map 450 forms result vector 460 which, when lambdaed with profile vector 470 from map 450, forms discrimination vector 480.

The entries along the horizontal axis of map 410 are preferably the same as or compatible with the entries along the horizontal axis of map 450. That is, the two maps share at least one clan. By way of example, map 410 could be a document-by-term matrix containing entries relating to frequencies that certain terms occur within a first group of documents. Map 450 could be a term-by-subject matrix containing entries relating to the relationship between terms and subjects. A user may desire to determine which documents in the first group are related to subjects in the second group.

Even if no map exists with information about how the documents in the first and second sets correlate, the user could use the cross-correlation operation to obtain the desired information. In that case, the user could create query vector 400 listing the set of documents of interest. After query vector 400 and map 410 have been composed to form result vector 420, the lambda function is performed between result vector 420 and profile vector 430 to form discrimination vector 440. Discrimination vector 440, which contains entries relating to the expectancies that terms actually occurred in the documents in query vector 400, and map 450 are composed to form result vector 460.

Discrimination vector 480 is formed using the lambda function on result vector 460 and profile vector 470. Using this operation, a user can evaluate discrimination vector 480 to determine which documents in the second group (e.g., map 450) are similar to the documents listed in query vector 400.

4. Structure Analysis

"Structure analysis" can be used to measure the similarities between pairs of elements from a set. These measures can be useful as input for various known multivariate analyses, including hierarchical clustering, partition clustering, factor analysis/singular value decomposition, Kohonen self-organizing maps, and multidimensional scaling.

In accordance with a preferred embodiment, a query vector for each individual item is composed with a map, and a lambda performed on each to form a first set of discrimination vectors.

For each pair of discrimination vectors $v_1$ and $v_2$ the following function is evaluated:

$$COS(d_1d_2)=(SQR(SUM(d_1*d_2))/MIN(SQR(SUM(d_1*d_1)),SQR(SUM(d_2*d_2)))$$

where SQR is the square root function, $d_1$ is the weight of a member of the vectors' clan in vector $v_1$, $d_2$ is the weight of the same member of the clan in vector $v_2$. SUM is the summation of all such values, and MIN is the minimum function. The value so computed is called a similarity measure. All of the similarity measures computed in this process are assembled as a matrix, as described and represented above, where the items and attributes are both members of the same clan, and the attribute values are the similarity measures. This matrix is called a similarity matrix and serves as the basis for further structure discovery analyses.

Structure discovery may be performed concurrently with the construction of a similarity matrix. For example, partition clustering may be performed by adding an item to a first group of items as long as the maximum similarity between the item and any of the items in the group is above a certain threshold. That item is placed in its own group, as are subsequent items. if they do not have a similarity with any other item in the first group that exceeds the given threshold. Items are processed in the order in which they occur in the similarity matrix, and processing an item involves only the portion of the similarity matrix previously computed. Thus, the computation of partition clusters may be performed concurrently with the computation of the similarity matrix upon which the clustering is based.

5. Affinity Analysis (Associativity Analysis)

Affinity analysis is a process for discovering "topics" in a map with respect to which queries may be expected to produce results. This analysis can be considered to be a bilateral overlapping clustering between two sets. That is, affinity analysis produces a set of query vectors representing the topics.

Consider a set of vectors as a matrix. Conventionally, this set of vectors may be considered to define a space, such that the set of vectors has a density, defined as the number of vectors located in the immediate vicinity of some point. There exists a set of particular points such that the density of the space at each of these points is a local maximum because the space is relatively more crowded in the vicinity of these points than at nearby points.

The map may be considered to be two spaces, one defined by its row vectors, and a second defined by its column vectors. If the map is a document→term map, then one may might call these two spaces the map's document space and term space. Affinity analysis finds all pairs of vectors, one in document space and the other in term space, such that each is at a local density maximum and each "retrieves" the other when used as a query vector. This set of pairs may be reasonably considered to be the comprehensive list of "interesting places" in the space(s) defined by the map. In terms of retrieval, the set of term vectors may be considered to be all of the topics upon which the map focuses, and the set of document vectors to be the set of documents that are about each of these topics.

6. Relevance feedback

A further operation that the invention can perform is relevance feedback where cross-correlations between elements in a set are discovered to enhance queries entered by a user. This analysis utilizes the bilateral nature of matrix operations to iteratively compose result vectors with the map to arrive at a final result vector. Relevance feedback is useful where a user essentially forms an incomplete query vector omitting elements that should have been included because, for example, the user did not realize that those elements were related to the ones that were included.

Figure 5:
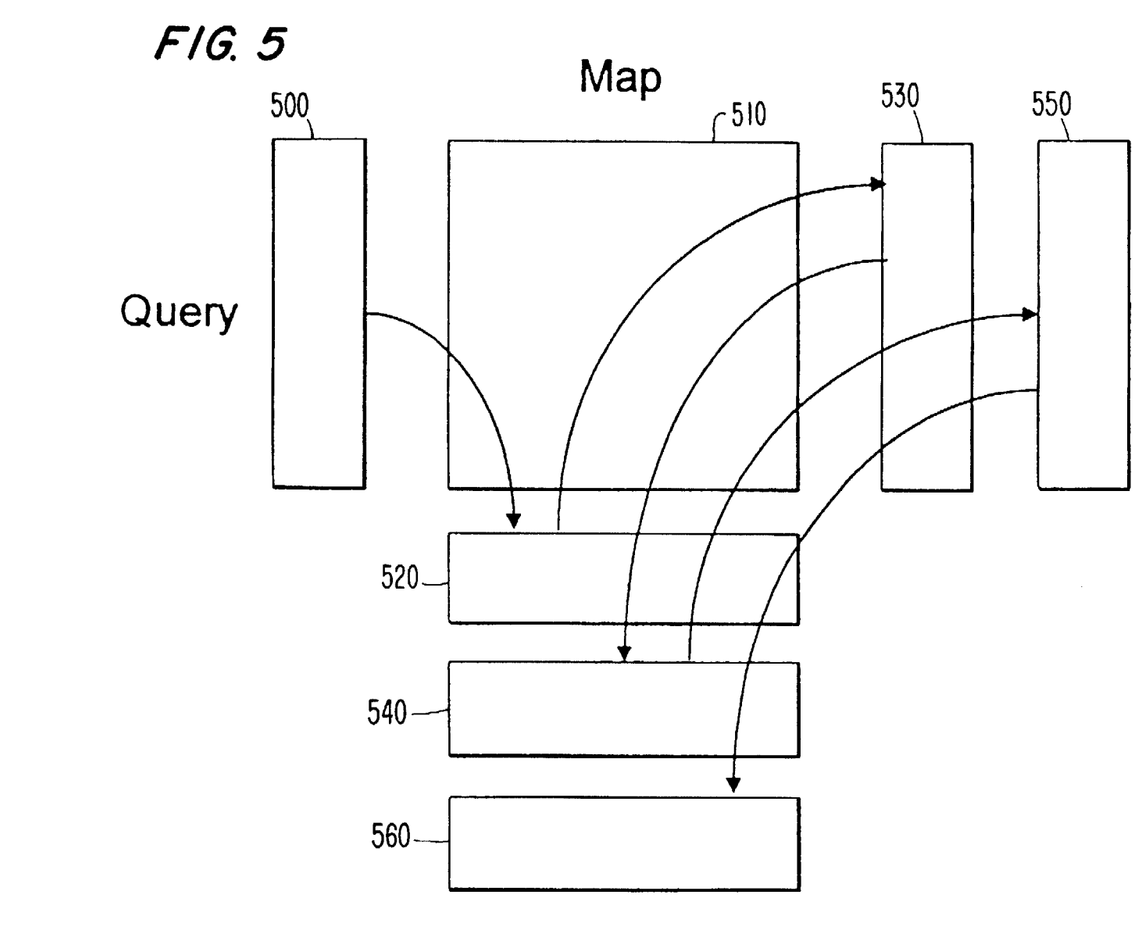
FIG. 5 is a representation of affinity analysis, in accordance with the invention.

FIG. 5 illustrates the operation of relevance feedback. Query vector 500 is composed with map 510 to form vector 520. Vector 520 then serves as a query vector and is composed with map 510 to form vector 530. Vector 530 serves as a query vector and is composed with map 510 to form vector 540. This process is repeated until either the contents of the result vector stabilizes within a predetermined threshold, or when the result vector is deemed to satisfy the user's search criteria.

For example, using the term-by-document map 510, a user can enter query vector 500 listing terms of interest. When vector 500 and map 510 are composed to form vector 520 listing documents, vector 520 is composed with map 510 to form vector 530 listing terms. Vector 530 may identify other terms within the documents that have a strong cross-correlation to the terms listed in query vector 500. These other terms may be synonyms of or related in some way to the terms listed in query vector 500.

If the process is repeated until the result vectors converge, after vector 530 is composed with map 510 to form vector 540, vector 540 is composed with map 510 to form vector 550, which lists terms. Vector 550 is compared with vector 530 to determine whether the contents of vector 550 have stabilized. If so, then vector 550 is composed with map 510 to form a final result vector 560. If not, then the process repeats until the contents of the result vector stabilizes.

If the process is performed under user control, vector 540 is presented to the user who then has the liberty to repeat the process if desired.

C. Applications

The operations described in Section B above can be applied to many different applications. Several examples are listed below, although the invention could be applied to other situations as well.

1. Database Searching

The development of large electronic storage devices has tremendously increased the usefulness of storing information in databases. However, as described in the Background section, access to these databases is not useful if the information stored in the databases is not easily manageable or selectively accessible.

The invention can be used as an on-line research tool for retrieving information of interest from databases. For example, documents can be retrieved using the data retrieval operation. Also, correlations between terms within the documents can be discovered through discrimination analysis. The similarities between documents can be compared using structure analysis. Finally, term queries can be enhanced to ensure that all documents of interest are retrieved using affinity analysis.

Another application of database searching is in the area of law enforcement. Using the invention can generate databases using a set of criteria related to types of crimes. The resulting specialized databases would contain focused information that could prove valuable to law enforcement personnel.

2. Data filtering

The invention could also be used to identify desirable or undesirable information received electronically, thereby relieving a user from being bombarded with an excess of information. For example, e-mail messages could be screened using discrimination analysis. Unwanted e-mail messages could be deleted without the user wasting his time reading them.

3. Data Analysis

The invention can be used for analyzing data used in making business decisions by detecting trends and correlations that may otherwise not be realized. For example, discrimination analysis may reveal that the demand for a particular good increases whenever the weather is warm. Equipped with this knowledge, a business can make better informed decisions about how much of that good to order and how often to restock the inventory of that good.

The invention can also be used to predict future events based upon past performance. For example, a map can be created plotting stock names on one axis and current events on the other axis. The entries in the map could be price changes of the stocks when each of the events have occurred. When a series of events occur, the user could create a query vector reflecting those series of events. The discrimination vector would reveal correlations between those events and the price change of certain stock.

In addition, the invention can be used on a network, such as the Internet, to identify bulletin boards or databases relating to a certain subject. For example, a user can form a query vector consisting of terms of interest. Using discrimination analysis, the user can identify those bulletin boards or databases that relate to the terms in the query vector. In this way, users can scan networks to find locations of interest quickly.

D. System Configuration

The operations described in Section B can run on any processor-based system capable of performing the described functions. The data analyzed by the system can be stored locally in a memory, such as a hard drive or a CD-ROM, connected directly to the system.

Alternatively, the data can be stored remotely from the system, in which case the system accesses the data through a communication device, such as a modem.

Figure 6:
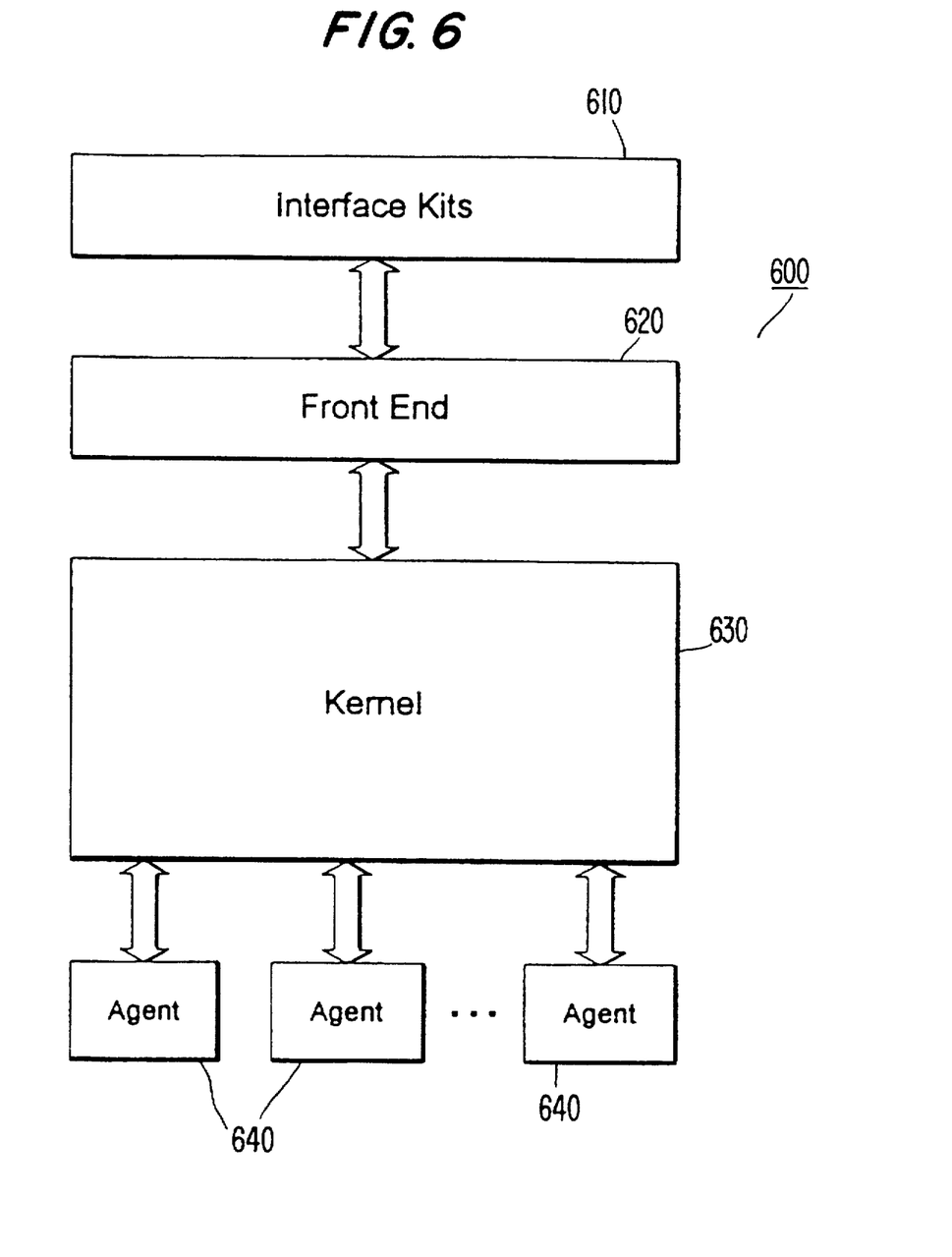
FIG. 6 is a block diagram of a data analysis system, in accordance with a preferred embodiment of the invention.

FIG. 6 illustrates one embodiment of a data processing system 600 for analyzing data in accordance with a preferred embodiment of the invention. As shown in FIG. 6, system 600 comprises interface kits 610, front end 620, kernel 630, and agents 640. Front end 620 connects to interface kits 610 and kernel 630, and kernel 630 connects to agents 640.

Interface kits 610 provide information between the knowledge engine, which comprises front end 620 and kernel 630, and application programs built on interface kits 610. Each interface kit 610 is tied to a particular operating environment. For example, the TK interface kit runs on X11. Further, the NeXTStep interface kit is provided to build Knowledge Engine application programs on machines running NeXTStep or OpenStep.

Front end 620 serves as the primary interface between the software in kernel 630 and interface kits 610 to provide interface functionality. Front end 620 provides system definitions and is preferably an extension of a programming language. The TCL front end is provided to build applications using an extension of the TCL language. Other front ends provide similar capabilities through the UNIX shell with the shell front end, and Objective C or C++ using the respective front ends. Each front end exists to enable development of new knowledge discovery based applications with minimal effort on a particular computing platform.

Kernel 630 preferably provides most of the functions described in Section B above. Kernel 630 receives instructions from front end 620 and carries out functions in accordance with the received instructions. Kernel 630 can preferably form maps from data, form vectors from query data received from front end 620, and compose query vectors and maps to form result vectors. In an alternative embodiment, kernel 630 can be accessed directly without front end 620, but at the loss of some of functionality provided by front end 620. Kernel 630 preferably comprises a processor capable of performing the functions described in Section B above.

Agents 640 implement several of the key abstract data types of kernel 630 in terms of various kinds of information systems, such as library systems, information retrieval systems, and database management systems. Each agent communicates with a respective information system to access databases or memory in that information system and pass that information to kernel 630.

Although not shown in FIG. 6, system 600 can also include its own memory, such as a hard drive or a CD-ROM, to store databases or other data. Kernel 630 can access the data bases stored in the memory and store other information, such as additional matrices, in the memory.

E. Software implementation

There are many ways to implement this invention. One way involves the system in FIG. 6 under the control of software written in TCL, a known programming language.

Preferably, the front end involves an interpreted language that is actually a superset of TCL. In addition to the common functions provided by TCL, the system has map functions, vector functions, clan functions, structure discovery functions, and other functions over maps and vectors.

The kernel, and subsequently the front end, provide primarily three abstract data types (ADTs): maps, vectors and clans. A map represents an entire associative store and can be thought of as a fuzzy mapping from one set onto another set. A vector represent some single numeric piece of information about a subset of items, and corresponds closely to vectors in vector model information retrieval. A clan represents a related class of things. Every vector is associated with a particular clan, and every map has a range clan and a domain clan which may, but need not, be different.

The preferred embodiment uses the object-oriented approach to implementing new types. Each ADT thus has at least a constructor function, a selector function, and a destructor function. A constructor function has a name which is the name of the ADT. A selector function is invoked with the name of an object followed by the name of an object followed by the name of the thing to be selected. A destructor function is invoked with the object name followed by free. This destroys the object and removes it from the Knowledge Engine name space.

A map constructor function takes a single argument, which is a Uniform Resource Locator (URL) identifying a collection that the system can use as a read only associative store. The URL has two elements separated by a colon. The first element is the name of an agent, e.g z3950, sybase or bpr. The second is a string giving sufficient information to find the collection on a local or remote machine. If the collection is on a remote machine, the name of the machine is given preceded by two slash characters, followed by a single slash. Everything after the slash is determined according the agent, although slashes are used to separate parts of the remainder of the string by convention.

A map constructor function, named "map", takes a single URL as an argument and returns the name of a map object. A map object is a mapping from one clan of objects (the map's domain) to another clan (the map's range). All further operations over this map object are performed by a TCL function whose name is the name of the map object.

The objects are indicated in the descriptions below by the italicized word "mapobj".

The selector functions are:

mapobj name→string
mapobj dialect→string
mapobj clan domain→clanobj
mapobj clan range→clanobj
mapobj count domain→int
mapobj count range→int
mapobj domain→vectorobj
mapobj range→vectorobj
mapobj pick tag→vectorobj
mapobj invert→mapobj The count selector gives the number of unique items in either the domain or range, if it is possible to do so. If not, because the underlying associative store does not know, and it is otherwise not possible to find out, then this selector returns −1.

The name and dialect selectors return the URL used to create the object, and the name of the agent, respectively. The remaining selectors implement most of the functionality of maps. The pick selector takes a single tag and returns a range vector object with all of the elements of the map that have a nonzero weight for the tag. Multiword queries are performed using a higher order function (compose) that ultimately invokes pick.

The domain selector returns a domain vector object, giving the total number of occurrences of each unique domain tag. The invert selector returns another map object, whose domain and range are the range and domain, respectively, of the given map object.

Vector objects store a single piece of information about each of a set of things. Vectors store both queries and the results of queries. Vector objects have a constructor function (vector), normally called with no arguments, but vector objects are normally created by other internal functions rather than explicitly by a user or application. An exception to this might be when a vector is written and subsequently read from a file by a TCL function. A second form of the constructor function takes the name of a file as a single argument, and reads in the vector stored in this file.

The selector functions are:

vectorobj size→int
vectorobj rewind→vectorobj
vectorobj get→tag scalar|NO_MORE_ITEMS
vectorobj put→nil|ERROR
vectorobj clan→clanobj The "size" selector returns the number of elements in the vector. Similarly, the "clan" selector returns the clan of which the items in the vector are a subset. The remaining selectors deal with putting elements into and taking elements out of vectors. Every vector has an implicit current element pointer. Either "put" or "get" advances the pointer to the next element. This is similar to seeking to the beginning of a file before reading or writing. The get selector normally returns a TCL list consisting of a tag, which is a string of characters followed by a scalar value (normally a number) associated with the tag. Vector objects do not support any retrieval indexed by tag. Objects are stored, or at least retrieved, in lexical order by tag.

"Factor" does a singular value decomposition of a map object. It returns two map objects and a vector. Assuming that the given map object m has a domain and range of a and b, respectively, the first returned map object has domain and range of a and "factor," respectively, and represents the k left singular vectors of m corresponding to the k largest singular values. A vector object is formed from a factor vector representing the k largest singular values.

The second map object returned has domain and range of "factor" and b, respectively. The value of k can be specified by an optional integer argument or determined heuristically. In this case, it is normally much smaller than either the size of the domain or range of m (i.e., m count domain or m count range). A further property of the returned map objects is that map inversion is computational inexpensive.

The partition function divides the range of a map object into groups of related objects. Partition returns a TCL list of lists of items.

The partition function is particularly useful for exploratory structure discovery. It can be used recursively to achieve an n-ary clustering, for example. Another useful application of partition is to divide a collection into a manageable set of pieces that are subsequently classified using multidimensional scaling.

The cluster function performs classical hierarchical clustering on the range elements of the given map object.

Several other functions implemented include:

apply func vectorobj→vectorobj
zip func vectorobj vectorobj→vectorobj
compose vectorobj mapobj func→vectorobj
lambda vectorobj vectorobj |number|→vectorobj Apply takes two arguments. One is a function that takes a single numeric argument and returns a number. The function can be one of several built-in functions or a function written in TCL. The second argument to apply is a vector object. Calling apply unconditionally destroys this object as a side effect before returning. Apply returns a new vector object with exactly the same elements as the given vector object, but with the value of each element replaced by the result of applying the function to the original value. The definition of apply in TCL is:

```
proc apply {func v} {
    set res |vector|
    $v rewind
    set r [$v get]
    while {[string match "$r" NO_MORE_ITEMS| != 1} {
        set val |eval $func |lindex $r 1||
        $res put |lindex $r 0| $val
        set r |$v get|
    }
    $v free
    return $res
}
```

The zip function nondestructively merges two vector objects into a single vector object. The third argument is a function that takes two numeric arguments, at least one of which is guaranteed to be nonzero, and returns a number. The value for a particular element in the returned vector is determined by applying the function to the values for the element in the two given vectors. If an element is in only one vector, then zero is substituted for the missing value.

The compose function composes a vector object with a map object, producing a vector object. In TCL, compose would be written:

```
proc compose {v m {local null} {global null}} {
    if {![string match $local null]} {
        set v |apply $local $v|
    }
    set r [[$v rewind| get]
    set res |vector|
    while {![string match "$r" NO_MORE_ITEMS]} {
        set vr [$m pick |lindex $r 0]]
        if {![string match $local null]} {
            set vr |apply $local $vr|
        }
        set res |zip plus $vr $res|
        set r |$v get|
    }
    if {![string match $global null]} {
        set res [apply $global $res]
    }
    return $res
}
```

The compose function selects each element of the vector, in turn, and uses pick to retrieve the corresponding range vector of the map. If a function is given, it is applied to the retrieved vector (apply $local $vr). This vector is then merged into the result (zip plus $vr $res), which is returned.

Finally, lambda evaluates a discrimination function on two vectors. First, it computes the sum of each of the vectors. Next, for each element that is in both vectors, it computes sigma for the element. If the computed sigma exceeded the optional threshold, then the element with value sigma, is inserted in the result vector object. Lambda is nondestructive. The lambda function can be implemented in the kernel or the front end.

The front end version simply calls the kernel version. The primary purpose of the front end version is to facilitate access by users or application programs.

CONCLUSION

From the preceding description, it is apparent how this invention identifies structures in data sets, cross-correlates between data from two data sets, identify similarities of attributes in a data set, and determine distance and similarity measures between items in a data set. It will be apparent to those skilled in the art that various modifications and variations can be made in the data analysis method and apparatus of the present invention without departing from the spirit or scope of the invention. The present invention is intended to cover the modifications and variations of this invention that come within the scope of the appended claims and their equivalents.

I claim:

1. A method for retrieving information from a collection of items each having a corresponding item identifier and each being associated by a scalar value with an attribute having a corresponding attribute identifier, at least one of the attributes also being associated with another of the items in the collection, the method comprising the steps, carried out by a data processor, of:

presenting the collection as a map of tuples of item identifiers, attribute identifiers, and scalar values;

forming a query vector having pairs of attribute identifiers and scalar values; and composing the query vector and the map to produce a result vector having pairs of item identifiers and corresponding scalar values, the scalar values representing the relationship of the query vector and the map for the items having the corresponding item values.

2. A method for retrieving information from a collection of items each having a corresponding item identifier and each being associated by a scalar value with an attribute having a corresponding attribute identifier, at least one of the attributes also being associated with another of the items in the collection, the method comprising the steps, carried out by a data processor, of:

presenting the collection as a map of tuples of item identifiers, attribute identifiers, and scalar values;

forming a query vector having pairs of attribute identifiers and scalar values;

composing the query vector and the map to produce a result vector having pairs of item identifiers and corresponding scalar values, the scalar values representing the relationship of the query vector and the map for the items having the corresponding item values;

reducing the map into a profile vector having pairs of item identifiers and corresponding scalar values, the scalar values each representing a global scalar value over all of the attributes in the map for the item having the item identifier corresponding to that scalar value; and forming a discrimination vector from the result vector and profile vector by comparing the scalar values in the result vector and profile vector corresponding to the same item identifiers in the profile and result vectors.

3. A method for comparing information from a collection of items each having a corresponding item identifier and each being associated by a scalar value with an attribute having a corresponding attribute identifier, at least one of the attributes also being associated with another of the items in the collection, the method comprising the steps, carried out by a data processor, of:

presenting the collection as a first map of tuples of item identifiers, attribute identifiers, and scalar values;

forming a query vector having pairs of attribute identifiers and scalar values;

composing the query vector and the first map to produce a first result vector having pairs of item identifiers and corresponding scalar values, the scalar values representing the relationship of the query vector and the first map for the items having the corresponding item values;

reducing the first map into a first profile vector having pairs of item identifiers and corresponding scalar values, the scalar values each representing a first global scalar value over all of the attributes in the first map for the item having the item identifier corresponding to that scalar value;

forming a first discrimination vector from the result and profile vectors by comparing the scalar values in the result vector and profile vector corresponding to the same item identifiers in the profile and result vectors;

presenting the collection as a second map of tuples of item identifiers, attribute identifiers, and scalar values, wherein the attribute identifiers of the second map are the item identifiers of the first map; and composing the discrimination vector and the second map to produce a second result vector having pairs of item identifiers and corresponding scalar values, the scalar values representing the relationship between the items of the first and second maps.

4. A method for analyzing the relationship of an input item and a collection of items each having a corresponding item identifier and each being associated by a scalar value with an attribute having a corresponding attribute identifier, at least one of the attributes also being associated with another of the items in the collection, the method comprising the steps, carried out by a data processor, of:

presenting the collection as a map of tuples of item identifiers, attribute identifiers, and scalar values;

forming query vectors each having pairs of attribute identifiers and scalar values;

composing the query vectors and the map to produce a set of result vectors for each of the items in the map, the result vectors comprising pairs of item identifiers and corresponding scalar values, and the scalar values representing the relationship of the query vectors and the map for the items having the corresponding item values;

reducing the map into a profile vector having pairs of item identifiers and corresponding scalar values, the scalar values each representing a first global scalar value over all of the attributes in the map for the item having the item identifier corresponding to that scalar value;

forming a set of item discrimination vectors from the profile vector and each of the normalized result vectors in the set by comparing the scalar values in the normalized result vectors and the profile vectors corresponding to the same item identifiers in the profile and result vectors;

forming a discrimination matrix from the set of item discrimination vectors;

forming an attribute vector corresponding to the input item;

forming an attribute discrimination vector from the attribute and profile vectors; and comparing the attribute discrimination vector and each discrimination vector in the discrimination matrix to determine a relationship between the input item and the collection.

5. A method for analyzing a collection of items each having a corresponding item identifier and each being associated by a scalar value with an attribute having a corresponding attribute identifier, at least one of the attributes also being associates with another of the items in the collection, the method comprising the steps, carried out by a data processor, of:

presenting the collection as a map of tuples of item identifiers, attribute identifiers, and scalar values;

forming query vectors each having pairs of attribute identifiers and scalar values;

composing the query vectors and the map to produce a set of result vectors for each of the items in the map, the result vectors having pairs of item identifiers and corresponding scalar values, and the scalar values representing the relationship of the first query vector and the first map for the items having the corresponding item values;

reducing the map into a profile vector having pairs of item identifiers and corresponding scalar values, the scalar values each representing a first global scalar value over all of the attributes in the first map for the item having the item identifier corresponding to that scalar value;

forming a set of item discrimination vectors from the profile vector and each of the normalized result vectors in the set by comparing the scalar values in the normalized result vectors and the profile vectors corresponding to the same item identifiers in the profile and result vectors;

forming a discrimination matrix from the set of item discrimination vectors; and comparing each of the discrimination vectors in the discrimination matrix with the other ones of the discrimination vectors in the discrimination matrix to produce a similarity metric for each pair of discrimination vectors, the similarity metric for each of the pairs of discrimination vectors indicating the similarity of the corresponding items.

6. The method of claim 5 wherein the step of comparing discrimination vectors includes the substep of forming dot products of pairs of discrimination vectors.

7. The method of claim 5 wherein the step of comparing discrimination vectors includes the substep of forming cosine products of pairs of discrimination vectors.

8. A method for organizing a collection of items each having a corresponding item identifier and each being associated by a scalar value with an attribute having a corresponding attribute identifier, at least one of the attributes also being associates with another of the items in the collection, the method comprising the steps, carried out by a data processor, of presenting the collection as a map of tuples of item identifiers, attribute identifiers, and scalar values;

forming query vectors each having pairs of attribute identifiers and scalar values;

composing the query vectors and the map to produce a set of result vectors for each of the items in the map, the result vectors having pairs of item identifiers and corresponding scalar values, and the scalar values representing the relationship of the first query vector and the first map for the items having the corresponding item values;

reducing the map into a profile vector having pairs of item identifiers and corresponding scalar values, the scalar values each representing a first global scalar value over all of the attributes in the first map for the item having the item identifier corresponding to that scalar value;

forming a set of item discrimination vectors from the profile vector and each of the normalized result vectors in the set by comparing the scalar values in the normalized result vectors and the profile vectors corresponding to the same item identifiers in the profile and result vectors;

forming a discrimination matrix from the set of item discrimination vectors;

comparing each of the discrimination vectors in the discrimination matrix with the other ones of the discrimination vectors in the discrimination matrix to produce a similarity metric for each pair of discrimination vectors, the similarity metric for each of the pairs of discrimination vectors indicating the similarity of the corresponding items;

forming a similarity matrix from the similarity metrics; and using the similarity matrix as an input to a multivariant statistical analysis package.

9. A method for determining characteristics in a collection of items each having a corresponding item identifier and each being associated by a scalar value with an attribute having a corresponding attribute identifier, at least one of the attributes also being associates with another of the items in the collection, the method comprising the steps, carried out by a data processor, of:

presenting the collection as a first map of tuples of item identifiers, attribute identifiers, and scalar values;

presenting the collection as a second map of tuples of item identifiers, attribute identifiers, and scalar values, wherein the attribute identifiers of the second map are the item identifiers of the first map and the item identifiers of the second map are the attribute identifiers of the first map;

reducing the first map into a first profile vector having pairs of item identifiers and corresponding scalar values, the scalar values each representing a first global scalar value over all of the attributes in the first map for the item having the item identifier corresponding to that scalar value; and analyzing the relationship of each item having an identifier in the first map, the analyzing step including the substeps, for each of the items of forming a query vector having pairs of attribute identifiers and scalar values, composing the query vector and the second map to produce a first result vector having pairs of item identifiers and corresponding scalar values, the scalar values representing the relationship of the first query vector and the first map for the items having the corresponding item values, forming a discrimination vector from the first result and profile vectors by comparing the scalar values in the result vectors and profile vectors corresponding to the same item identifiers in the profile and result vectors, composing the discrimination vector and the first map to produce a second result vector, continuing the composing step and the discrimination forming steps with the second result vector as the query vector if the similarity between the query vector and the second result vector is below a first predetermined threshold, and adding the tuple of the query vector and the discrimination vector to a list of stored tuples if the similarity between the query vector and the second result vector exceeds the first predetermined threshold and the similarity between the discrimination vector and other discrimination vectors in the stored tuples is below a second predetermined threshold.

10. A computer system for deriving structure from sets of information, the computer system comprising:

an agent coupled to the set of information to retrieve tuples of information from the sets;

a kernel, coupled to the agent, for deriving structure from the tuples of information received from the agents, the kernel including means for forming the tuples of information into a map of item identifiers, attribute identifiers, and scalar values, means for forming a query vector from a user input, the query vector having pairs of attribute identifiers and scalar values, and means for composing the query vector and the map to produce a result vector having pairs of item identifiers and corresponding scalar values; and a front end unit, coupled to the kernel, for receiving the user input.

11. The computer system of claim 10, further including a plurality of agents each coupled to a different set of information.

12. A system for retrieving information from a collection of items each having a corresponding item identifier and each being associated by a scalar value with an attribute having a corresponding attribute identifier, at least one of the attributes also being associated with another of the items in the collection, comprising:

means for presenting the collection as a map of tuples of item identifiers, attribute identifiers, and scalar values;

means for forming a query vector having pairs of attribute identifiers and scalar values; and means for composing the query vector and the map to produce a result vector having pairs of item identifiers and corresponding scalar values, the scalar values representing the relationship of the query vector and the map for the items having the corresponding item values.

13. A system for retrieving information from a collection of items each having a corresponding item identifier and each being associated by a scalar value with an attribute having a corresponding attribute identifier, at least one of the attributes also being associated with another of the items in the collection, comprising:

means for presenting the collection as a map of tuples of item identifiers, attribute identifiers, and scalar values;

means for forming a query vector having pairs of attribute identifiers and scalar values;

means for composing the query vector and the map to produce a result vector having pairs of item identifiers and corresponding scalar values, the scalar values representing the relationship of the query vector and the map for the items having the corresponding item values;

means for reducing the map into a profile vector having pairs of item identifiers and corresponding scalar values, the scalar values each representing a global scalar value over all of the attributes in the map for the item having the item identifier corresponding to that scalar value; and means for forming a discrimination vector from the result vector and profile vector by comparing the scalar values in the result vector and profile vector corresponding to the same item identifiers in the profile and results vectors.

14. An article of manufacture for causing a computer to derive structure from sets of information, comprising:

means, coupled to the set of information, for causing a computer to retrieve tuples of information from the sets;

means, coupled to the agent, for causing a computer to derive structure from the tuples of information received from the agents, including means for causing a computer to form the tuples of information into a map of item identifiers, attribute identifiers, and scalar values, means for causing a computer to form a query vector from a user input, the query vector having pairs of attribute identifiers and scalar values, and means for causing a computer to compose the query vector and the map to produce a result vector having pairs of item identifiers and corresponding scalar values; and means, coupled to the kernel, for causing a computer to receive the user input.

15. An article of manufacture for causing a computer to retrieve information from a collection of items each having a corresponding item identifier and each being associated by a scalar value with an attribute having a corresponding attribute identifier, at least one of the attributes also being associated with another of the items in the collection, comprising:

means for causing a computer to present the collection as a map of tuples of item identifiers, attribute identifiers, and scalar values;

means for causing a computer to form a query vector having pairs of attribute identifiers and scalar values; and means for causing a computer to compose the query vector and the map to produce a result vector having pairs of item identifiers and corresponding scalar values, the scalar values representing the relationship of the query vector and the map for the items having the corresponding item values.

16. An article of manufacture for causing a computer to retrieve information from a collection of items each having a corresponding item identifier and each being associated by a scalar value with an attribute having a corresponding attribute identifier, at least one of the attributes also being associated with another of the items in the collection, the method comprising:

means for causing a computer to present the collection as a map of tuples of item identifiers, attribute identifiers, and scalar values;

means for causing a computer to form a query vector having pairs of attribute identifiers and scalar values;

means for causing a computer to compose the query vector and the map to produce a result vector having pairs of item identifiers and corresponding scalar values, the scalar values representing the relationship of the query vector and the map for the items having the corresponding item values;

means for causing a computer to reduce the map into a profile vector having pairs of item identifiers and corresponding scalar values, the scalar values each representing a global scalar value over all of the attributes in the map for the item having the item identifier corresponding to that scalar value; and means for causing a computer to form a discrimination vector from the result vector and profile vector by comparing the scalar values in the result vector and profile vector corresponding to the same item identifiers in the profile and result vectors.

\* \* \* \* \*